May 19, 1942.   E. G. BUSSE   2,283,847
RAILWAY BRAKE GEAR SUPPORT

Filed Oct. 13, 1941

INVENTOR.
EDWIN G. BUSSE
BY Rodney Bedell
ATTORNEY

Patented May 19, 1942

2,283,847

UNITED STATES PATENT OFFICE 2,283,847

RAILWAY BRAKE GEAR SUPPORT

Edwin G. Busse, Chicago, Ill., assignor to Chicago Railway Equipment Company, Chicago, Ill., a corporation of Illinois Application October 13, 1941, Serial No. 414,723

6 Claims. (Cl. 188—210)

The invention relates to railway rolling stock, and more particularly to devices which underlie the brake gear to guide the latter in its movement or to support the same, particularly in the event of failure of the hangers which normally carry the gear from the truck side frame.

The present application contains subject matter divided from an earlier application, filed November 10, 1939, Serial No. 303,783, and forms a continuation in part of said application.

It is common practice to mount the brake gear safety guards on various truck parts such as spring planks, side frames, equalizers and bolsters by securing the guards by bolts and pins extending through an element of the guard and the associated truck part.

The main object of the invention is to secure a brake gear safety guard to the bottom of a truck bolster or similar truck part with a minimum number of elements and particularly without requiring mounting brackets attached to the bolster.

Preferably the safety device is of spring material and is retained in place largely by its own resiliency and it is another object of the invention to avoid perforating a spring member of this type for retaining bolts or like elements.

These and other more detailed objects as will appear from the following description are attained by the structures illustrated in the accompanying drawing in which—

Figure 1:
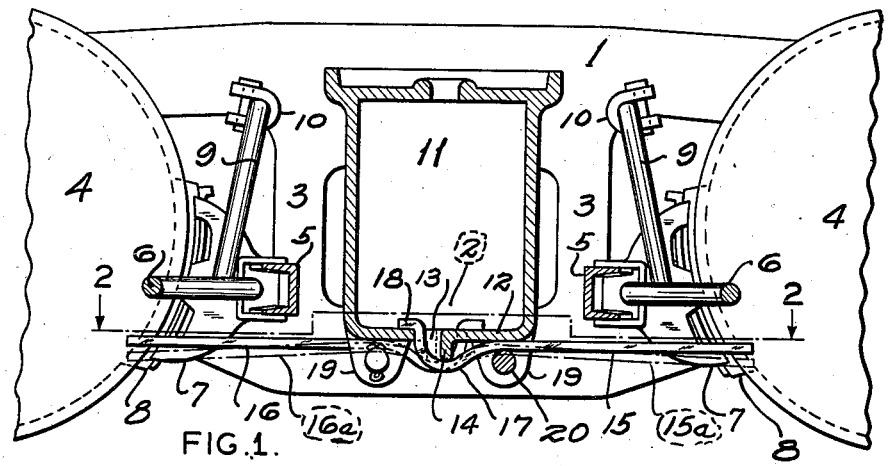
Figure 1 is a longitudinal section through a familiar type of a four-wheel truck showing a portion of the usual brake gear with a safety guard arrangement embodying the present invention.

The structure illustrated in Figure 1 includes the truck side frame 1, provided with bolster spring seats 2, and struts or bolster guides 3. The side frame is carried on axle journal boxes (not shown) mounted on the axles of wheels 4. Each brake beam includes a channel compression member 5, tension rod 6 and brake heads 7 with shoes 8. The beam is supported by the usual hangers 9 swinging from brackets 10 on the side frames. All of the above parts are well known in the art and in themselves do not constitute the present invention.

A box section bolster 11 is carried on the truck springs (not shown) and includes a bottom wall 12 apertured or recessed at 13 and having depending lugs 14 adjacent the apertures. Individual support arms 15, 16 are provided for the brake beams and each arm has its inner end bowed downwardly at 17, to engage the lower edge of the corresponding lug 14, and then extending upwardly through the aperture in the bolster bottom wall and terminating in a lip 18 overlying the top face of the bolster bottom wall.

Ears 19 depend from the bolster bottom wall at the sides of each support arm and position the latter longitudinally of the bolster. The normal contour of the arms is indicated at dotted lines 15a and 16a in Figure 1 but, when the arm is installed, it is distorted upwardly to the full line position, preferably in contact with the bottom wall of the bolster where it is secured by a holding pin 20.

Figure 3:
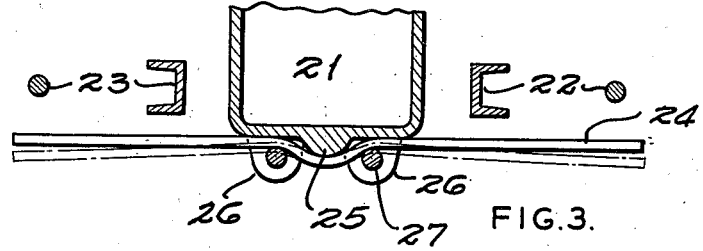
Figures 3 and 4 are detail sectional views corresponding to the middle portion of Figure 1 and illustrating other forms of the invention.

With this arrangement the support for each beam may be installed or removed independently of the support for the other beam, but the essential features of the invention may be embodied in a single support arm for both beams and such an arrangement is illustrated in Figure 3 in which the bolster is indicated at 21, the two brake beams at 22 and 23 respectively, and the single support arm at 24. The bottom wall of the bolster is not perforated but includes an arcuate depending lug 25 at the center of the bolster and pairs of depending ears 26 at opposite sides of lug 25.

The arm has its intermediate part bowed to receive the lug, and the adjacent portions of the arm are distorted from their normal contour, as indicated in the broken lines, to the full line position when the device is applied, the arm being held assembled with the bolster by pins 27.

Figure 2:
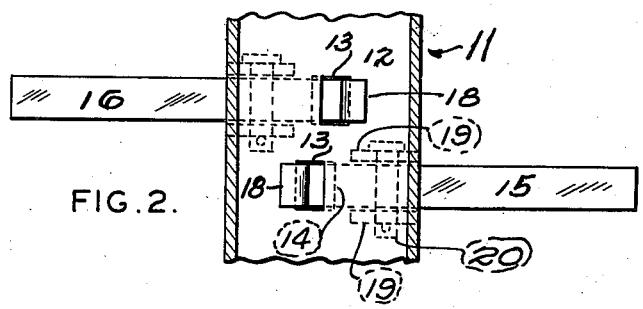
Figure 2 is a horizontal sectional view taken on the line 2—2 of Figure 1.
Figure 4:
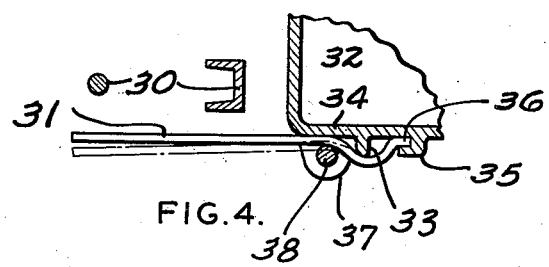

Figure 4 illustrates another form of the invention in which each brake beam 30 is provided with an individual support arm 31. The bolster 32 has a depending lug 33 for each arm corresponding to lugs 13 shown in Figures 1 and 2, but instead of the bolster bottom wall 34 being apertured to receive the inner end of the arm, the wall has a downward projection 35 forming a pocket or recess to receive the lip 36 on the inner end of the arm. The assembly is completed by ears 37 and pin 38 similar to corresponding parts previously described.

In each form of the invention the beam is provided with a guide or support readily applied or removed from the truck bolster and without requiring the riveting of brackets to the bolster. The arrangements shown in Figures 3 and 4 avoid apertures in the bottom wall which some may consider objectionable.

In each form of the invention the support is so clamped by the securing elements that its resiliency holds the parts against rattling and wear.

It is to be understood that the forms described are illustrative and obviously various other arrangements may be adopted without departing from the spirit of the invention, and the exclusive use of such modifications as come within the scope of the claims is contemplated.

The term "support," as used in the claims, includes devices of the type described, whether functioning normally as an actual support for the brake gear or as a guard normally out of contact with the beam but positioned relative thereto to prevent the beam from dropping to the rail in the event of failure of a hanger, or functioning mainly as a guide for maintaining the angularity of the beam in its movement to and from the wheel.

What is claimed is:

1. In combination with a railway bolster having a bottom wall provided with a recess and with an adjacent projection, a brake gear support arm of spring material overlying said projection and having an end received in said recess, an element carried by said wall at a point at the side of said projection spaced from said recess and supporting the corresponding portion of the arm, the portion of the arm between said recess and element being distorted by said projection to hold the arm in assembled relation with the bolster.

2. A bolster and brake gear support arm assembly as described in claim 1 in which the element holding the arm to the bolster wall is readily detachable to accommodate the application and removal of the arm to and from the bolster.

3. In combination with a railway bolster having a bottom wall provided with an aperture and with a downwardly projecting lug adjacent said aperture, a brake gear support arm of spring material extending beneath said lug with an upturned end portion received in said aperture and terminating in a lip overlying said wall, and means at the side of said lug opposite said aperture holding said arm distorted and against the bottom of said bolster wall.

4. In combination with a railway bolster having a bottom wall provided with a pair of depending ears, a brake gear support arm of spring material passing between said ears with its adjacent end seated in said wall, and a detachable pin seated in said ears and underlying said arm and holding it distorted to thrust portions thereof spaced from said ears against said wall.

5. In combination with a railway bolster having a bottom wall provided with a depending lug and with a downward projection at one side of said lug and forming a pocket opening towards said lug, said wall also having a pair of depending ears at the other side of said lug, a brake gear support arm of spring material with its end received in said pocket and then bending downwardly and upwardly around said lug, and a detachable pin seated in said ears and engaging the underside of said arm to hold the latter distorted against the bolster bottom wall and thereby maintain its assembly with the bolster.

6. In combination with a railway bolster having a bottom wall with integral upwardly-facing and downwardly-facing elements, a brake gear support member of spring material with a portion overlying said upwardly-facing element and a portion spaced therefrom longitudinally of the member and underlying said downwardly-facing element, and a removable device seated in the bolster and spaced from said portions and holding said member distorted and in assembly with the bolster.

EDWIN G. BUSSE.